(12) United States Patent
Kuo et al.

(10) Patent No.: US 10,058,204 B2
(45) Date of Patent: Aug. 28, 2018

(54) LUMINOUS BASE (71) Applicants: Chia-Shin Kuo, New Taipei (TW); Yu-Feng Kuo, New Taipei (TW)

(72) Inventors: Chia-Shin Kuo, New Taipei (TW); Yu-Feng Kuo, New Taipei (TW)

( * ) Notice: Subject to any disclaimer, the term of this patent is extended or adjusted under 35 U.S.C. 154(b) by 0 days.

(21) Appl. No.: 15/616,365

(22) Filed: Jun. 7, 2017

(65) Prior Publication Data
US 2018/0014677 A1  Jan. 18, 2018

(30) Foreign Application Priority Data
Jul. 12, 2016 (TW) .............................. 105210467 U (51) Int. Cl.
| | |
|---|---|
| *F21V 7/04* | (2006.01) |
| *A47G 23/03* | (2006.01) |
| *F21L 4/00* | (2006.01) |
| *F21V 33/00* | (2006.01) |
| *F21V 8/00* | (2006.01) |
| *F21Y 115/10* | (2016.01) |

(52) U.S. Cl.
CPC ............ *A47G 23/0309* (2013.01); *F21L 4/00* (2013.01); *F21V 33/0036* (2013.01); *G02B 6/0051* (2013.01); *G02B 6/0053* (2013.01); *G02B 6/0055* (2013.01); *G02B 6/0083* (2013.01); *G02B 6/0088* (2013.01); *F21Y 2115/10* (2016.08)

(58) Field of Classification Search
CPC .............. A47G 23/0309; G02B 6/0051; G02B 6/0053; G02B 6/0055; G02B 6/0083; G02B 6/0088; F21L 4/00; F21V 33/0036; F21Y 2115/10
See application file for complete search history.

(56) References Cited

U.S. PATENT DOCUMENTS

| | | | | |
|---|---|---|---|---|
| 4,336,574 A | * | 6/1982 | Goodman .......... | A47G 23/0309 248/346.11 |
| 4,344,113 A | * | 8/1982 | Ditto ................... | A47G 19/2227 362/101 |
| 4,858,084 A | * | 8/1989 | Sheryll .............. | A47G 23/0309 362/101 |
| 5,307,250 A | * | 4/1994 | Pearson ............. | A47G 23/0309 200/85 R |
| 6,164,793 A | * | 12/2000 | Wu .................... | A47G 19/2227 362/101 |

(Continued)

*Primary Examiner* — Donald Raleigh
(74) *Attorney, Agent, or Firm* — Chun-Ming Shih; HDLS IPR Services (57) ABSTRACT

A luminous base includes a base body, a light guide structure, a light emitting module and a power supply module. The base body has a cover with a light outlet; the light guide structure is installed at the base body and configured to be corresponsive to the light outlet; the light emitting module is installed in the base body for projecting light towards the light guide structure; the power supply module is electrically connected to the light emitting module. Therefore, light can be illuminated upwardly from the bottom of a cup and/or a beverage bottle in a surface emitting manner, and the existence of the cup and/or the beverage bottle can be highlighted to provide a glare effect in a dark environment, and the light can be illuminated uniformly upward from the bottom of the cup and/or the beverage bottle to provide a light staining effect.

9 Claims, 8 Drawing Sheets

(56) References Cited

U.S. PATENT DOCUMENTS

| | | | |
|---|---|---|---|
| 6,354,711 B1* | 3/2002 | McCoy | A47G 23/0309 362/101 |
| 6,459,919 B1* | 10/2002 | Lys | A61N 5/0616 315/291 |
| 9,432,758 B1* | 8/2016 | Kirk | H04R 1/028 |
| 2004/0114352 A1* | 6/2004 | Jensen | A47G 23/0309 362/101 |
| 2004/0125594 A1* | 7/2004 | Wu | A47G 23/0309 362/101 |
| 2010/0157596 A1* | 6/2010 | Wen | F21V 29/004 362/235 |
| 2012/0127741 A1* | 5/2012 | Osada | F21V 23/006 362/373 |
| 2012/0230041 A1* | 9/2012 | Mizuta | F21K 9/233 362/373 |
| 2013/0107570 A1* | 5/2013 | Liao | F21V 29/004 362/609 |
| 2016/0331168 A1* | 11/2016 | Godinez | A47G 23/0309 |
| 2017/0135178 A1* | 5/2017 | Sutton | H05B 33/0872 |
| 2017/0139108 A1* | 5/2017 | Boomgaarden | G02B 6/0041 |
| 2017/0351143 A1* | 12/2017 | Kadowaki | G02F 1/133603 |

* cited by examiner

LUMINOUS BASE

FIELD OF THE INVENTION

This disclosure relates to a carrying base, and more particularly to a luminous base capable of emitting light from the bottom of a cup or a beverage bottle.

BACKGROUND OF THE INVENTION

In recent years, people live with lots of nightlife, and may order beverages in places such as nightclubs, pubs, etc, and some nightclubs or pubs may prepare cup mats for consumers to put a cup of the mat when not drinking the beverage.

However, the conventional cup mat is simply provided for putting a cup, and it may be monotonous and fails to highlight oneself or attract others in the dark place (such as the nightclub or pub), and sometimes one cannot find the cup in the dark environment, and these problems have been criticized for a long time.

In view of the aforementioned drawbacks of the prior art, the discloser of this disclosure conducted extensive research and provided a feasible design to overcome the drawbacks of the prior art.

SUMMARY OF THE INVENTION

Therefore, it is a primary objective of the present invention to provide a luminous base with a surface emitting design capable of providing light from the bottom of a cup or beverage bottle to highlight the existence of the cup or beverage bottle in the dark environment, so as to achieve the effect of attracting others.

To achieve the aforementioned and other objectives, this disclosure provides a luminous base, comprising: a base body, having a cover with a light outlet formed thereon; a light guide structure, installed at the base body, and configured to be corresponsive to the light outlet; a light emitting module, installed in the base body, and provided for projecting light towards the light guide structure; and a power supply module, electrically coupled to the light emitting module, and provided for supplying electric power.

Compared with the prior art, this disclosure has the following effect. The luminous base with the surface emitting effect can providing illumination from the bottom of the cup or beverage bottle, so as to highlight the existence of the cup or beverage bottle in the dark environment and achieve the effect of attracting others.

DESCRIPTION OF THE PREFERRED EMBODIMENTS

The technical contents of the present invention will become apparent with the detailed description of preferred embodiments accompanied with the illustration of related drawings as follows. It is noteworthy that the preferred embodiments are provided for illustrating this disclosure rather than restricting the scope of the disclosure.

Figure 3:
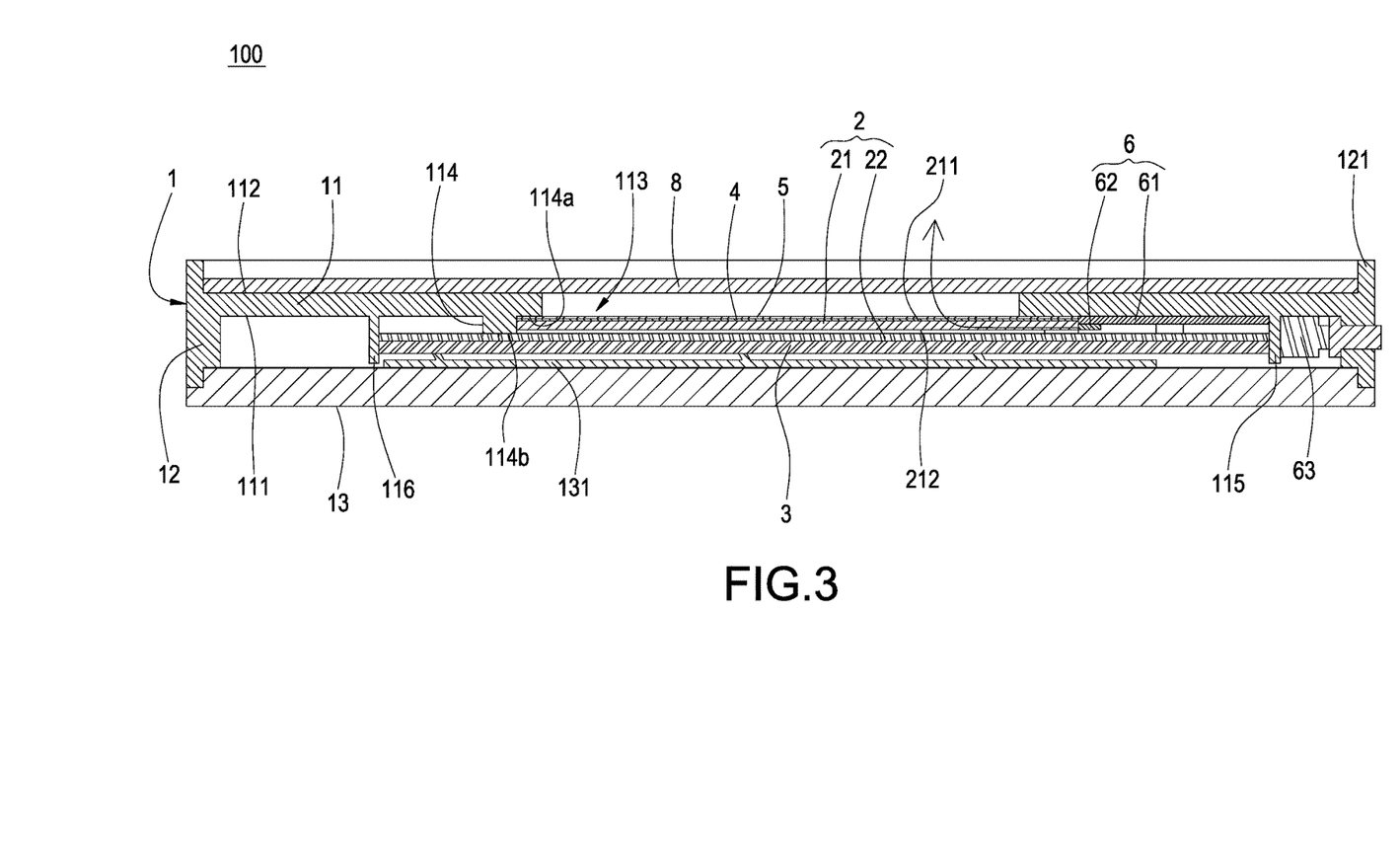
FIG. 3 is a sectional view of the first preferred embodiment of this disclosure, showing a light emitting status, a light guide status, and a light output status.
Figure 4:
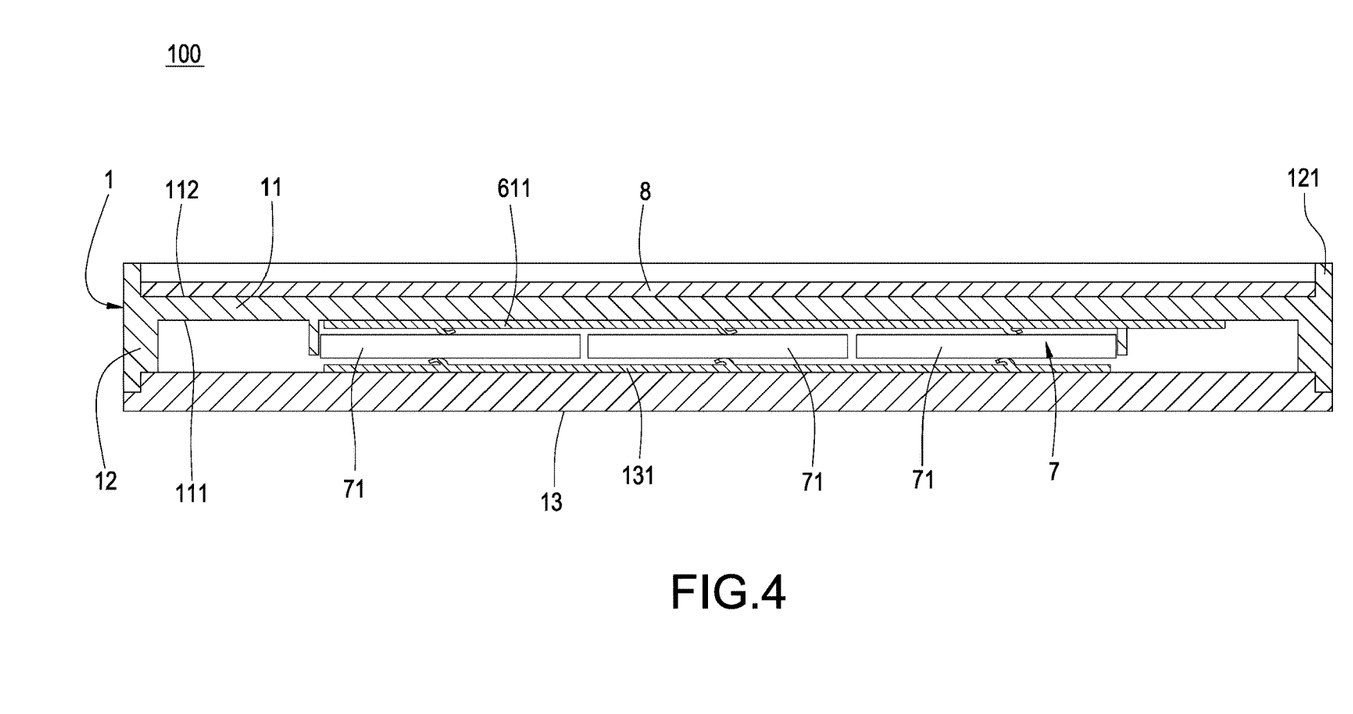
FIG. 4 is another sectional view of the first preferred embodiment of this disclosure, showing the status of electrically connecting to a power supply module.
Figure 5:
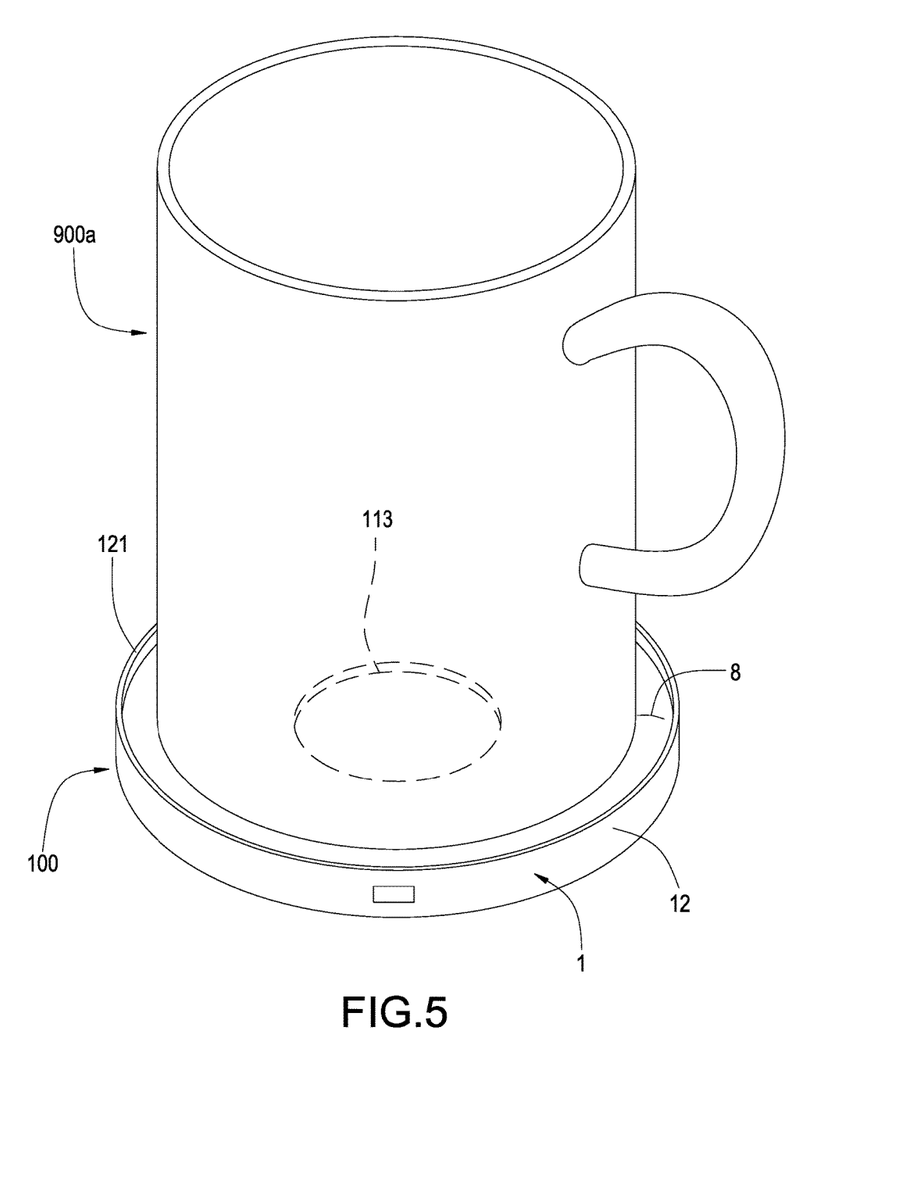
FIG. 5 is a schematic perspective view of a first preferred embodiment of this disclosure when carrying a cup.
Figure 6:
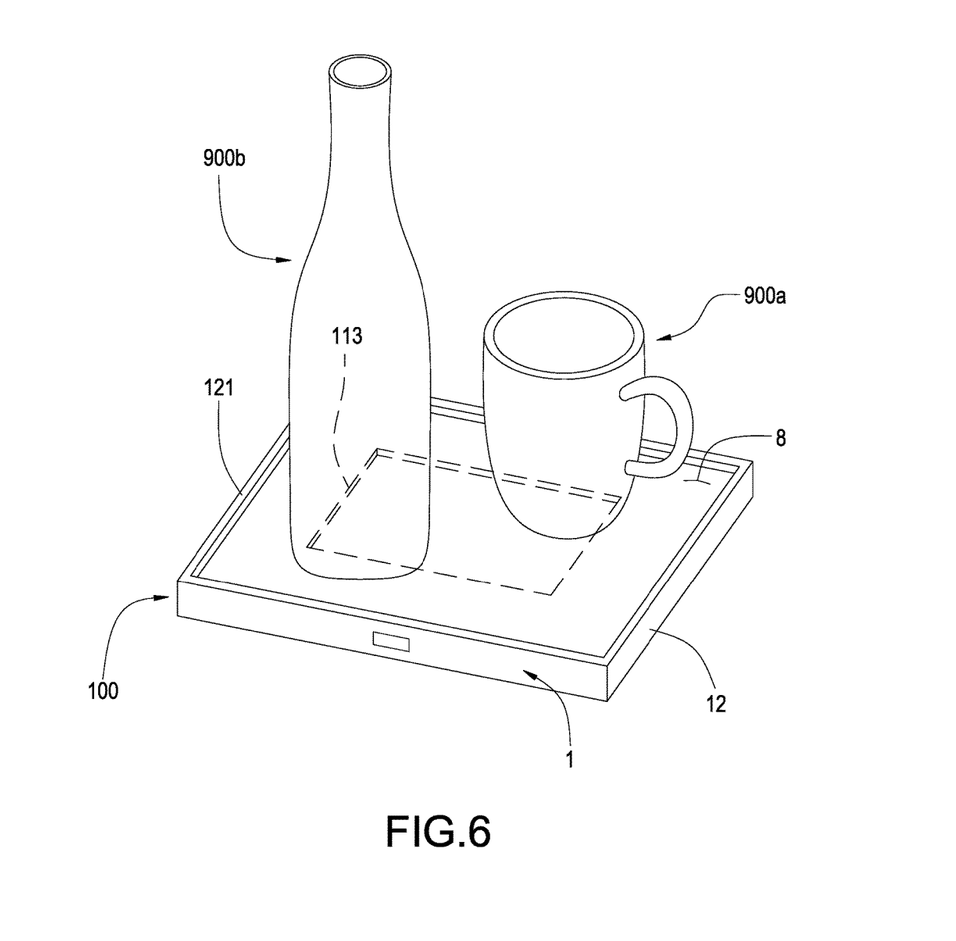
FIG. 6 is a schematic perspective view of another implementation of the first preferred embodiment of this disclosure when carrying a cup and a beverage bottle at the same time.
Figure 7:
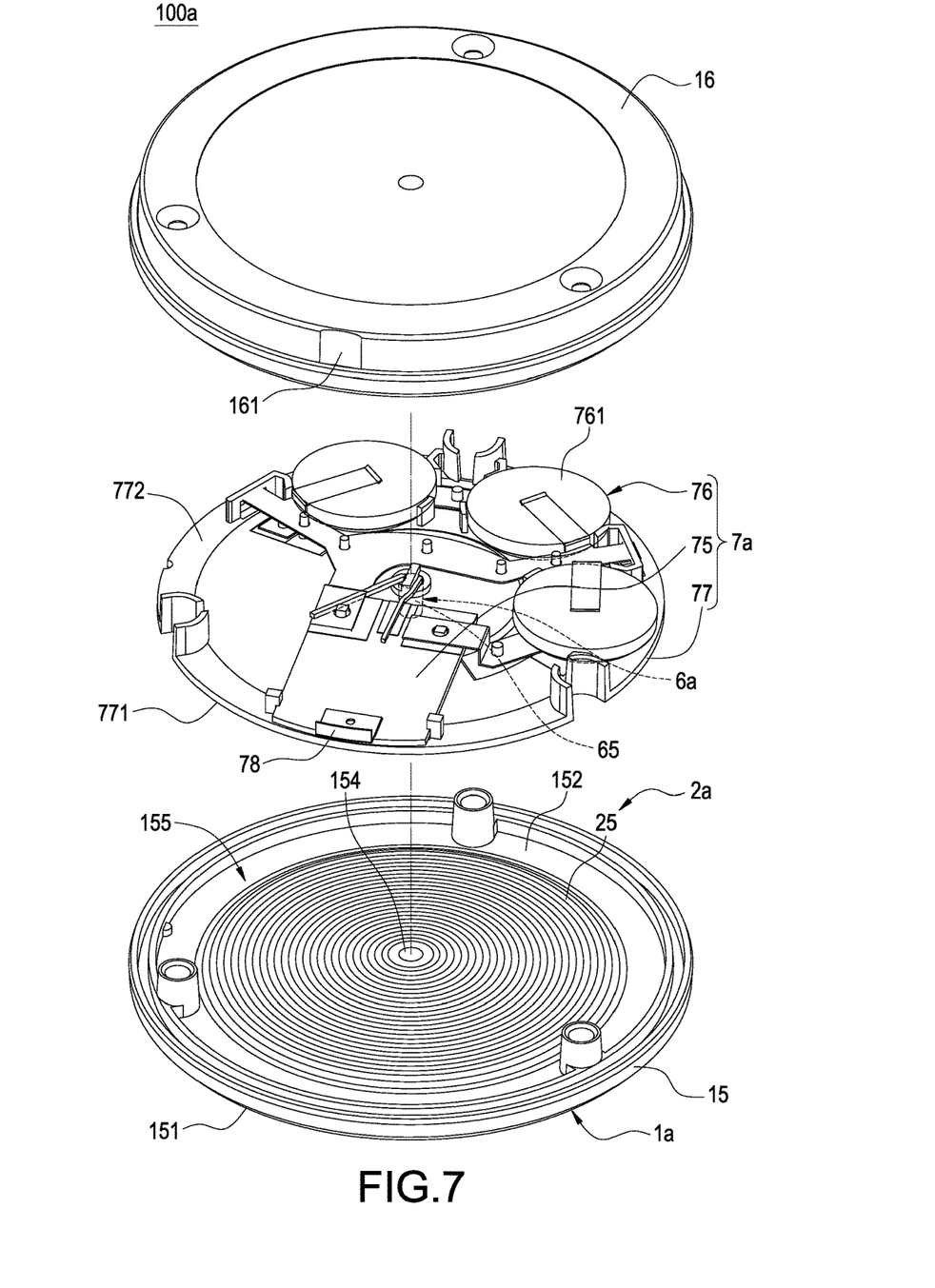
FIG. 7 is an exploded view of a second preferred embodiment of this disclosure being placed upside down.
Figure 8:
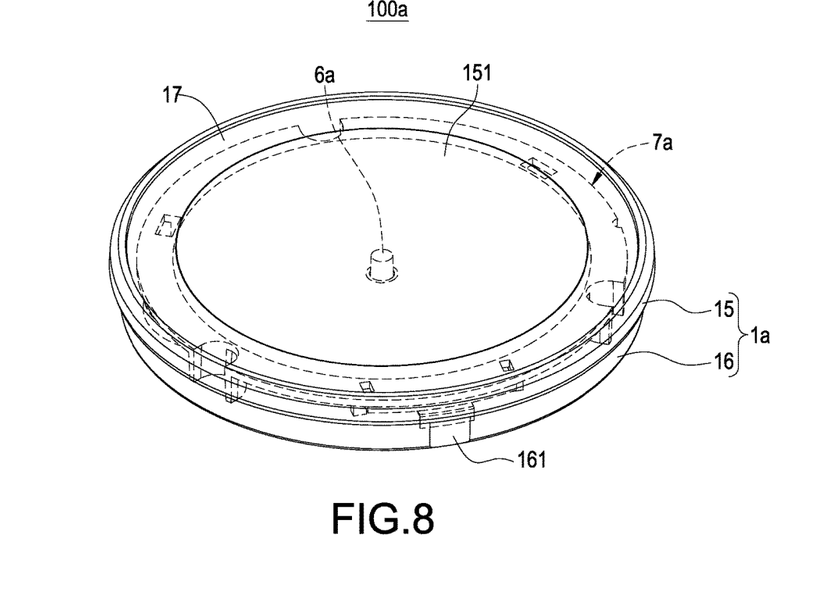
FIG. 8 is a perspective view of the second preferred embodiment of this disclosure being placed normally.
Figure 9:
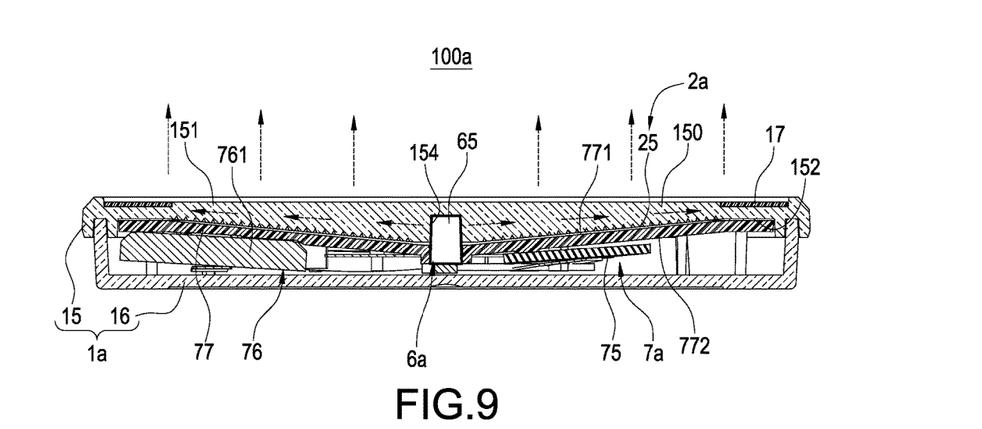
FIG. 9 is a sectional view of the second preferred embodiment of this disclosure as depicted in FIG. 8.

In FIGS. 5 and 6, this disclosure provides a luminous base for carrying a cup 900*a* and/or a beverage bottle 900*b*, and the first preferred embodiment of the luminous base is shown in FIGS. 1 to 6, and the second preferred embodiment of the luminous base is shown in FIGS. 7 to 9.

Figure 1:
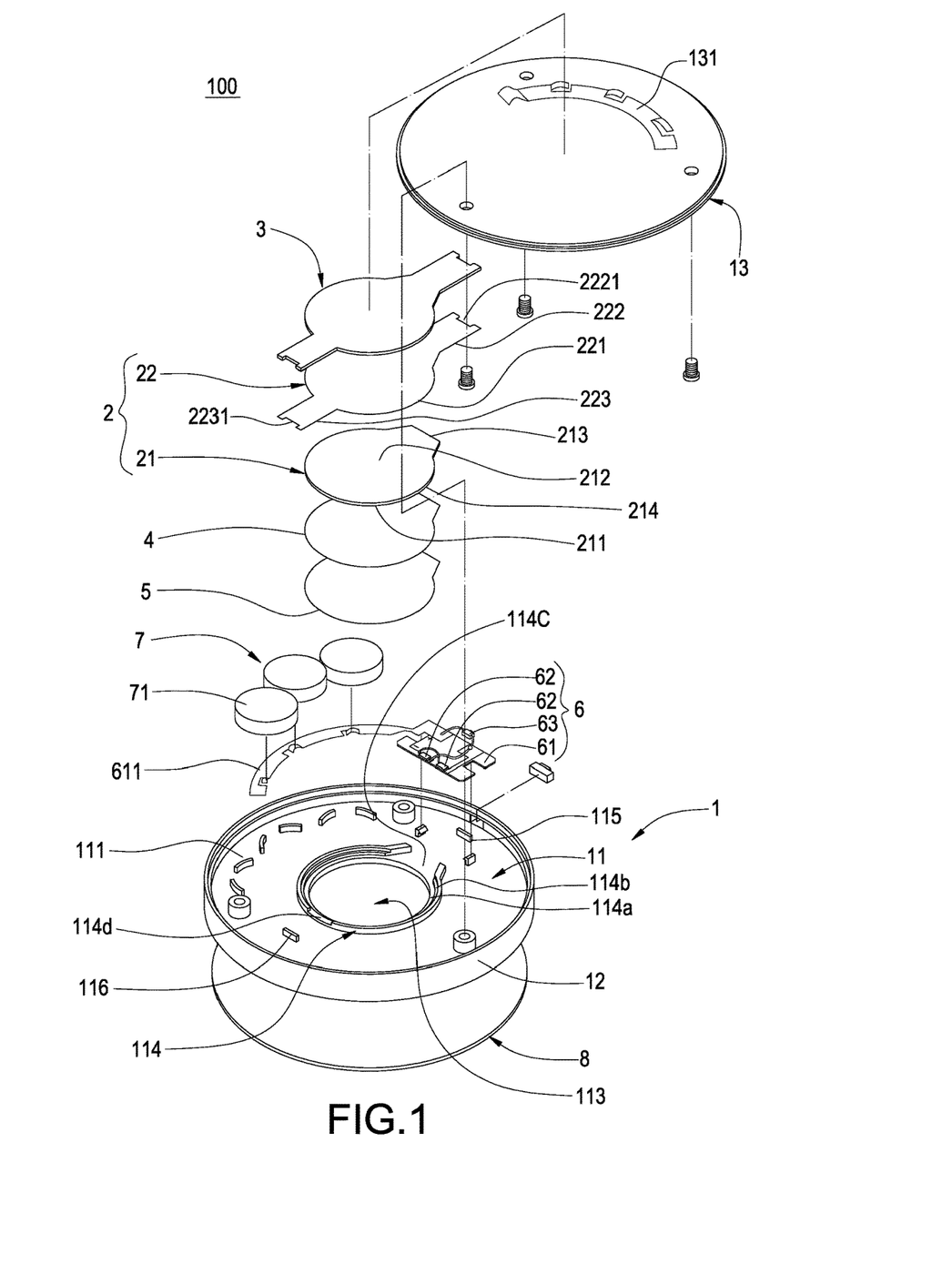
FIG. 1 is an exploded view of a first preferred embodiment of this disclosure.
Figure 2:
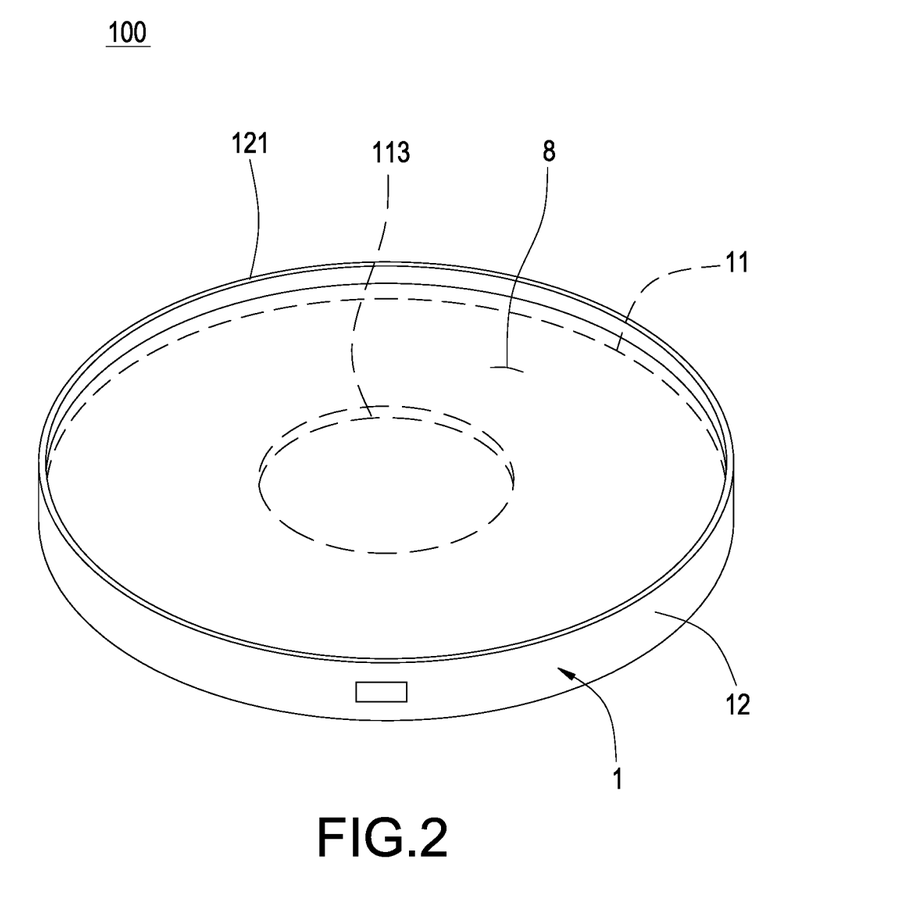
FIG. 2 is a perspective view of the first preferred embodiment of this disclosure.

In FIGS. 1 to 3, the luminous base 100 in accordance with the first preferred embodiment of this disclosure comprises a base body 1, a light guide structure 2, a light emitting module 6 and a power supply module 7, and preferably further comprises a pressing plate 3, a diffuser 4, a prism 5 and a translucent plate 8.

The structure of the base body 1 of this disclosure is not limited, and can be an integral structure (with a light outlet 113 formed on the base body 1), or a modular structure. The modular structure is used in this preferred embodiment for illustrating the disclosure.

The base body 1 includes a cover 11, a surrounding plate 12 disposed around the periphery of the cover 11, and a bottom plate 13 detachably covered and sealed onto an end opening of the surrounding plate 12. The cover 11 has a light outlet 113, and an inner side 111 and a retaining side 112 opposite to each other (as shown in FIG. 3), so that the cup 900*a* and/or the beverage bottle 900*b* can be carried on the retaining side 112.

The structure of the cover 11 of this preferred embodiment provided for shading and positioning is not limited to the above structure, and the cover 11 (which may have the shading effect and output light from the light outlet 113) has a shading wall 114 disposed at the priory of the inner side 111 of the cover 11 and configured to be corresponsive to the light outlet 113, a first level 114*a* is formed between the inner edge of the shading wall 114 and the inner side 111 of the cover 11, and preferably a second level 114*b* formed at the inner edge of the shading wall 114, and the first and second levels 114*a*, 114*b* are coupled to each other in a stairway manner. The shading wall 114 has a first notch 114*c* (with a depth reaching the first level 114*a* and the second level 114*b* as shown in FIG. 1), and preferably further has a second notch 114*d* (with a depth just reaching just the second level 114*b* but not the first level 114*a* as shown in FIG. 1), and the first and second notches 114*c*, 114*d* as shown in the figure are opposite to each other to facilitate a better positioning effect. The inner side 111 of the cover 11 has a first positioning element 115 and a second positioning element 11 protruded from the inner side 111 and configured to be corresponsive to the first notch 114*a* and the second notch 114*b* respectively.

The light guide structure 2 is installed in the base body 1 and configured to be corresponsive to the light outlet 113 for guiding light to be outputted from the light outlet 113. The light guide structure 2 of this disclosure is not limited. In this preferred embodiment, the light guide structure 2 covers the light outlet 113 and includes a light guide plate 21 and a reflector 22 stacked and coupled with each other. The light guide plate 21 has a light output side 211, a relative side 212 opposite to the light output side 211, and a periphery 214 and a light input edge 213 disposed around the light guide plate 21, and the light output side 211 faces the light outlet 113, and the reflector 22 is attached onto the relative side 212.

The light guide structure 2 is installed and positioned in the shading wall 114. More specifically, the light guide structure 2 is embedded and positioned into the first level 114a, so that the periphery of the light guide structure 2 (which is the periphery of the light guide plate 21) is shaded by the shading wall 114 without any light leakage.

The light emitting module 6 is installed in the base body 1 and provided for projecting light at the light guide structure 2. The structure of the light emitting module 6 is not limited in this disclosure, and will be described in this preferred embodiment as follows. The light emitting module 6 includes a circuit board 61 and at least one directive light emitting element 62 electrically installed onto the circuit board 61. Specifically, the directive light emitting element 62 is a light emitting diode, and there may be two light emitting diodes, and each directive light emitting element 62 inputs light through the first notch 114c to the light input edge 213 of the light guide plate 21, and outputs the light through the light outlet 113 from the light output side 211.

The light emitting module 6 further includes a control switch 63 electrically coupled to the circuit board 61 and provided for controlling the ON or OFF of each directive light emitting element 62.

The power supply module 7 is electrically coupled to the light emitting module 6 for supplying power to the light emitting module 6. In FIG. 4, the structure of the power supply module 7 in this disclosure is not limited and will be described in this preferred embodiment as follows. The bottom plate 13 has a sealed surface with a first conductive member 131, and the cover 11 has an inner side 111 with a second conductive member 611 installed thereon and configured to be corresponsive to the first conductive member 131, and a plurality of batteries 71 is clamped and positioned between the first and second conductive members 131, 611 to achieve an electrical connection with each other, and the second conductive member 611 is electrically coupled to the circuit board 61.

When the control switch 63 is ON, the power supply module 7 supplies power to the light emitting module 6, and each directive light emitting element 62 projects light towards the light input edge 213 of the light guide plate 21, and the light guide structure 2 guides the light to be outputted from the light output side 211 of the light guide plate 21 through the light outlet 113 to achieve the effect of a surface-emitting luminous base 100 in accordance with the first preferred embodiment of this disclosure. The surface-emitting side refers to the top side of the luminous base 100 and more specifically to the retaining side 112 of the cover 11.

To make the light guide structure 2 more stable and prevent it from being shifted, a pressing plate 3 is embedded and positioned into the second level 114b of the shading wall 114, and the first and second levels 114a, 114b coupled with each other in a stairway form are provided for securely attaching the light guide module 2 and pressing the first level 114a of the shading wall 114 by the pressing plate 3 to prevent the light guide module 2 from shifting.

The way of positioning the reflector 22 is not limited in this disclosure and will be described in this preferred embodiment as follows. The reflector 22 includes a main body 221 and first and second protruding arms 222, 223 protruded from the main body 221, and the main body 221 is embedded and positioned in the first level 114, and the first and second protruding arms 222, 223 are protruded from the first and second notches 114c, 1114d respectively and out from the shading wall 114, and can be detachably fixed onto the inner side 111 of the cover 11. Specifically, the first and second protruding arms 222, 223 have first and second positioning portions 2221, 2231 configured to be corresponsive to the first and second positioning elements 115, 116 respectively. In this preferred embodiment, each positioning element 115, 116 may be a pillar protruded from the inner side 111, and each positioning portion 2221, 2231 may have a free end at the first and second protruding arms 222, 223 separately, and two latch grooves configured to be corresponsive to the two pillars respectively, so that the first and second positioning portions 2221, 2231 and the first and second positioning elements 115, 116 are latched and fixed with each other.

The way of positioning the pressing plate 3 is not limited in this disclosure, and will be described in this preferred embodiment as follows. The pressing plate 3 has the same shape and structure of the reflector 22, so that the portion of the pressing plate 3 corresponsive to the main body 221 is embedded and positioned into the second level 114b. In addition, the portion of the pressing plate 3 corresponsive to the first and second protruding arms 222, 223 is protruded from the first and second notches 114c, 114d and out from the shading wall 114 and can be detachably latched and positioned with the first and second positioning elements 115, 116, so that the pressing plate 3 can force the light guide structure 2 to be securely positioned to the first level 114a without shifting by pressing the reflector 22 at the light guide structure 2.

To enhance the light outputted from the luminous base 100 through the light guide structure 2 in a surface-emitting manner, the luminous base 100 further comprises a diffuser 4 and a prism 5 stacked and coupled to each other, and the light guide structure 2 is stacked on the diffuser 4 and the prism 5 and embedded and positioned into the first level 114a. Therefore, the light outputted from the light guide structure 2 is enhanced by the diffuser 4 and the prism 5.

In FIG. 5, the luminous base 100 further comprises a translucent plate 8 attached onto the retaining side 112 of the cover 11 and covering the light outlet 113, and the surrounding plate 12 has a flange 121 protruded with a certain height from the translucent plate 8, so that the flange 121 can surround and block the condensed water dropped from the cup 900a and/or the beverage bottle 900b (as shown in FIG. 6) to prevent water from flowing to the outside of the luminous base 100. The so-called light-emitting side refers to the top side of the luminous base 100 which is the outer side of the translucent plate 8 in this preferred embodiment. The so-called retaining side also refers to the outer side of the translucent plate 8.

With reference to FIG. 6 for a schematic perspective view of another implementation of the first preferred embodiment of this disclosure, this implementation is substantially the same as the first preferred embodiment except that the shape of the luminous base 100 of this implementation is different from that of the first preferred embodiment. Specifically, the luminous base 100 of this implementation is substantially in a rectangular shape (which may be the shape of a square or a rectangle) provided for the following three carrying methods. 1. The luminous base 100 can carry a plurality of cups 900a at the same time. 2. The luminous base 100 can carry a plurality of beverage bottles 900b at the same time. 3. The luminous base 100 can carry at least one cup 900a and at least one beverage bottle 900b at the same time.

With reference to FIGS. 7 to 9 for a luminous base 100a in accordance with the second preferred embodiment of this disclosure, the luminous base 100a comprises a base body 1a, a light guide structure 2a, a light emitting module 6a and a power supply module 76, and preferably further comprises a circuit board component 7a, a switch 78 and a cover plate 17.

The base body 1a includes a cover 15 and a bottom plate 16 engaged with each other, and the circuit board component 7a and the light emitting module 6a are accommodated between the cover 15 and the bottom plate 16.

The cover 15 has a light outlet 155 (as shown in FIG. 7) and a shell plate 150 (as shown in FIG. 9) configured to be corresponsive to the light outlet 155, and the shell plate 150 has a retaining side 151 and an inner wall 152 disposed opposite to each other. The inner wall 152 has a light guide structure 2a which is a light guide pattern 25, so that the light guide pattern 25 and the retaining side 151 are spaced and disposed opposite to each other. The shell plate 150 has a hole body 154 formed on an inner wall 152 of the shell plate 150 and facing towards the retaining side 151. The light guide pattern 25 may be a printed pattern, a carved pattern or a textured pattern formed on the inner wall 152. The external periphery of the bottom plate 16 further has a contact portion 161.

The circuit board component 7a is installed in the base body 1a and includes a circuit board body 75, a base plate 77 and a power supply module 76 electrically coupled to the circuit board body 75. The power supply module 76 includes a plurality of batteries 761 and a plurality of positioning frames for positioning the batteries 761. The base plate 77 is installed in the base body 1a, and the circuit board body 75 and the power supply module 76 are installed on the back side 772 of the base plate 77.

The light emitting module 6a (which may be a light emitting member) electrically coupled to the circuit board body 75 and has a light emitting portion 65 for emitting light. The light emitting portion 65 is penetrated and exposed from a front side 771 of the base plate 77, and further plugged into the hole body 154 for emitting light in 360 degrees. The switch 78 may be a touch switch copper plate installed on the base body 1a, configured to be corresponsive to the contact portion 161, and electrically coupled to the circuit board body 75, and the circuit board component 7a is provided for controlling the ON and OFF of the light emitting module 6a to emit light or stop emitting light respectively.

The touch contact portion 161 is provided for triggering the switch 78, so that the light emitting module 6a and the power supply module 76 are electrically conducted to emit light, and the light in the shell plate 150 is projected and scattered from the hole body 154 to the surrounding. During the light scattering process, the light guide pattern 25 is provided for guiding and outputting the light from the retaining side 151 in a light diffusion manner, so as to achieve the effect of uniform light. In FIG. 9, the retaining side 111 further has a cover plate 17 such as a water absorbent plate, an anti-slip mat, or a bright plate for covering any ugly portion (such as the screws screwed between the cover 15 and the bottom plate 16) and the portion of uniform light output (which may be the position near the retaining side 151).

In summation of the description above, this disclosure improves over the prior art as follows: The special design of the light guide structure 2, 2a can output light from the light outlet 113, 155 in a surface-emitting manner, so that the light can be illuminated upwardly from the bottom of the cup 900a and/or the beverage bottle 900b, and the existence of the cup 900a and/or the beverage bottle 900b can be highlighted in a dark place. The luminous base of this disclosure can attract the attention of others with glare, so as to highlight and express oneself. In addition, the luminous base also provides uniform light projected upwardly from the bottom of the cup 900a and/or the beverage bottle 900b to produce a light staining effect.

In addition, the first preferred embodiment of this disclosure and its other implementation also have the following effects: 1. The pressing plate 3 is provided for pressing the light guide structure 2 to be positioned in the first level 114a securely without shifting. 2. The shape and structure of the pressing plate 3 are the same as those of the reflector 22, so that the reflector 22 can use its first and second protruding arms 222, 223 to latch and position the first and second positioning elements 115, 116, and the pressing plate 3 can use its first and second protruding arms (not labeled in the figure) to latch and position the first and second positioning elements 115, 116, and the reflector 22 and pressing plate 3 can be securely positioned onto the inner side 111 of the cover 11. As a result, the light guide structure 2 is securely positioned into the first level 114a, and the light guide structure 2 will not produce any shifting of the guided light. 3. The shading wall 114 is disposed around the periphery of the light guide structure 2, and only the first notch 114c is used to project the light of the light emitting module 6 towards the light input edge 213, so as to achieve a better shading effect and reduce light leakage to improve the light outputting effect. 4. The flange 121 of the surrounding plate 12 surrounds and blocks any condensed water dropped from the cup 900a and/or the beverage bottle 900b to prevent the water from flowing to the outside of the luminous base 100.

In addition, the second preferred embodiment of this disclosure has the following effects: 1. The base body 1a has a light guide structure 2a which may be a light guide pattern 25, and the light emitting portion 65 of the light emitting module 6a is plugged into a position corresponsive to the light guide pattern 25, so that the base body 1a has both light guide and light diffusion effects to simplify the light guide structure, or even has a uniform light effect. 2. The simplified light guide structure and/or switch structure has the advantages of easy assembling and reduced cost.

What is claimed is:

1. A luminous base, comprising:
a base body, having a cover with a light outlet formed thereon;
a light guide structure, installed at the base body, and configured to be corresponsive to the light outlet;
a light emitting module, installed in the base body, and provided for projecting light towards the light guide structure; and
a power supply module, electrically coupled to the light emitting module, and provided for supplying electric power,
wherein the cover has a shading wall disposed on an inner side of the cover and configured to be corresponsive to the periphery of the light outlet, and the shading wall has a first notch, and the light guide structure covers the light outlet, and the light guide structure is installed and positioned inside the shading wall, and the periphery of the light guide structure is covered by the shading wall without light leakage, and the light emitting module projects light from the first notch towards the light guide structure.

2. The luminous base of claim 1, further comprising a first level formed between the shading wall and the cover, wherein the light guide structure is embedded into the first level for positioning.

3. The luminous base of claim 2, further comprising a pressing plate, wherein the shading wall further has a second level, and the first level and the second level are coupled with each other in a stairway form, and the pressing plate is embedded into the second level for positioning, and the pressing plate presses the light guide structure to be positioned in the first level.

4. The luminous base of claim 1, wherein the light guide structure includes a light guide plate and a reflector, and the light guide plate has a light input edge, a light output side and a relative side opposite to the light outlet, and the light outlet faces towards the light outlet, and the reflector is attached onto the relative side, and the light emitting module projects the light at the light input edge of the light guide plate, and the light outlet is provided for outputting light from the light output side.

5. The luminous base of claim 1, further comprising a diffuser and a prism stacked and coupled with each other, and the light guide structure being stacked with the diffuser and the prism altogether and positioned in the shading wall.

6. The luminous base of claim 2, further comprising a diffuser and a prism stacked and coupled with each other, and the light guide structure being stacked with the diffuser and the prism altogether and embedded into the first level for positioning.

7. A luminous base, comprising:
   a base body, having a cover with a light outlet formed thereon;
   a light guide structure, installed at the base body, and configured to be corresponsive to the light outlet;
   a light emitting module, installed in the base body, and provided for projecting light towards the light guide structure; and
   a power supply module, electrically coupled to the light emitting module, and provided for supplying electric power,
   wherein the base body has a retaining side and an inner wall opposite to each other and corresponsive to the light outlet, and the light guide structure is a light guide pattern disposed on the inner wall, and the base body further has a hole disposed in the light guide pattern, and the light emitting module has a light emitting portion plugged into the hole, and the light of the light emitting portion is guided by the light guide pattern and outputted from the retaining side.

8. The luminous base of claim 7, wherein the hole is disposed at the middle of the retaining side.

9. The luminous base of claim 7, wherein the light guide pattern is a printed pattern, a carved pattern or a textured pattern.

* * * * *